United States Patent
Horikawa

(10) Patent No.: US 7,936,130 B2
(45) Date of Patent: May 3, 2011

(54) DISCHARGE LAMP LIGHTING APPARATUS

(75) Inventor: Takumi Horikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 354 days.

(21) Appl. No.: 12/249,335

(22) Filed: Oct. 10, 2008

(65) Prior Publication Data
US 2009/0315474 A1  Dec. 24, 2009

(30) Foreign Application Priority Data
Jun. 18, 2008  (JP) .................................. 2008-159014

(51) Int. Cl.
*H05B 37/02*  (2006.01)
(52) U.S. Cl. ..................... 315/224; 315/307; 315/DIG. 5
(58) Field of Classification Search ................. 315/291, 315/307, 308, DIG. 5, 224, DIG. 2
See application file for complete search history.

(56) References Cited

U.S. PATENT DOCUMENTS
6,815,912 B2 * 11/2004 Ishihara et al. ............... 315/308
7,002,305 B2 *  2/2006 Kambara et al. ............. 315/291

FOREIGN PATENT DOCUMENTS
JP 2001-273984  10/2001
JP 2008-59806  3/2008
JP 2008-98074  4/2008

* cited by examiner

*Primary Examiner* — David Hung Vu
(74) *Attorney, Agent, or Firm* — Oblon, Spivak, McClelland, Maier & Neustadt, L.L.P.

(57) ABSTRACT

A discharge lamp lighting apparatus includes a DC/DC converter for converting an input direct voltage to a direct voltage of a different voltage value than the input direct voltage by switching and then outputting the converted direct voltage; a discharge lamp driver for converting the output direct voltage, which is supplied from the DC/DC converter, to a voltage suitable for driving a discharge lamp; a pulse width controller for generating a pulse width controlled switching control signal based on a reference pulse and then supplying the switching control signal to the DC/DC converter; and a microprocessor for controlling the apparatus as a whole and supplying to the pulse width controller a pulse width control signal and the reference pulse in synchronism with the pulse width control signal.

6 Claims, 2 Drawing Sheets

DISCHARGE LAMP LIGHTING APPARATUS

BACKGROUND OF THE INVENTION

1. Field of the Invention

The present invention relates to a discharge lamp lighting apparatus.

2. Description of the Related Art

Recently, high intensity discharge lamps (HID lamps) have been developed as a lighting source of video devices such as projectors, auto headlights, and display lightings. Such discharge lamps are characterized in that high intensity can be obtained with a low power as compared with conventional lighting sources and in particular, are highly promising as a lighting source of projectors and auto headlights.

For lighting such discharge lamps, there have been proposed various types of discharge lamp lighting apparatuses. The proposed discharge lamp lighting apparatuses can be classified into three depending on their starting methods, i.e., a direct current starting method (Japanese Unexamined Patent Application Publication No. 2001-273984), a low frequency starting method, and a high frequency starting method (Japanese Unexamined Patent Application Publication No. 2008-59806). The direct current starting method is a method in which a high-voltage pulse is generated for starting with a constant direct voltage applied between electrodes of a discharge lamp and the direct voltage is maintained for a given length of time after starting the discharge. The low frequency starting method is a method in which a high-voltage pulse is generated with an alternating voltage of a frequency as low as a few hundred Hz applied between electrodes of a discharge lamp and the frequency is maintained after starting the discharge. The high frequency starting method is a method in which a high-voltage pulse is generated with an alternating voltage of a frequency as high as a few dozen kHz applied between electrodes of a discharge lamp and the frequency is maintained after starting the discharge.

The above starting methods have different driving methods but are similar in having a DC/DC converter at the front stage of a circuit component for driving a discharge lamp (discharge lamp driver). The DC/DC converter is adapted to convert an input direct voltage, which is obtained such as by rectifying and smoothing a commercial AC source, to a direct voltage of a different voltage value than the input direct voltage by switching and then output the converted direct voltage, while the discharge lamp driver is adapted to convert the direct voltage, which is supplied from the DC/DC converter, to a voltage suitable for driving a discharge lamp.

When using the DC/DC converter, since the interelectrode voltage (tube voltage) of a discharge lamp greatly varies between the starting operation and the stationary operation, the pulse width is controlled, for example, in order to stabilize power consumption of the discharge lamp regardless of such a variation. For controlling the pulse width, there is adopted a pulse width control IC containing a reference pulse oscillator. The pulse width control IC receives a pulse width control signal from a microprocessor (MPU) and generates a pulse width controlled switching control signal using waveform of an oscillating signal of the contained reference pulse oscillator. The switching control signal is supplied to the DC/DC converter and pulse width controlled switching operation is performed by the DC/DC converter. The DC/DC converter performs the switching operation at a high switching frequency equal to or greater than 50 kHz.

The DC/DC converter has a smoothing circuit such as of a capacitor input type on its output side, thereby converting a switching output to a direct voltage. Since the DC/DC converter performs the switching operation at a high switching frequency equal to or greater than 50 kHz, as described above, the direct voltage contains a ripple corresponding to the switching frequency and the ripple is supplied to the discharge lamp driver.

The discharge lamp driver has a function of converting a direct current, which is supplied from the DC/DC converter, to an alternating voltage suitable for driving the discharge lamp during stationary operation (DC/AC inverter). The switching frequency of the DC/AC inverter is generally set at a value lower than the frequency of the DC/DC converter. In the case of the low frequency starting method, for example, it is about 100 to 150 Hz. Accordingly, the ripple contained in the direct voltage of the DC/DC converter appears in the output waveform of the DC/AC inverter as it is, whereby a ripple current flows through the discharge lamp.

The discharge lamp lighting apparatus, which has the above basic configuration and operates as described above, has the following incidental problems regardless of the starting methods.

(1) Problems Related to Ripple Current

The ripple current has to be reduced as much as possible because it affects the quality of light from the discharge lamp and the lifetime of the discharge lamp. In conventional discharge lamp lighting apparatuses, the reduction of the ripple current has been achieved either by increasing the capacity of a capacitor or the inductance of an inductor in the smoothing circuit attached to the DC/DC converter or by increasing the switching frequency of the DC/DC converter.

However, increasing the capacity of a capacitor or the inductance of an inductor in the smoothing circuit results in increasing the size and cost of the discharge lamp lighting apparatus. On the other hand, increasing the switching frequency of the DC/DC converter results in increasing the heat generation and temperature of the DC/DC converter.

(2) Problems Related to Microprocessor

In discharge lamp lighting apparatuses, the microprocessor for controlling the apparatus as a whole is sometimes influenced by some external factor, so that the program may run out of control into a failure mode where the electric potential is fixed at all the output terminals of the microprocessor. If the behavior at this time is analyzed by FEMA (Failure Mode and Effect Analysis), the apparatus itself may go out of control. Accordingly, heretofore, a monitoring circuit has been provided outside the microprocessor to monitor the runaway and stop the operation of the discharge lamp lighting apparatus upon detection of the runaway. This increases the number of elements constituting the discharge lamp lighting apparatus, hindering miniaturization and cost reduction.

(3) Problems Related to Oscillation Frequency of Pulse Width Control IC

In conventional discharge lamp lighting apparatuses, a pulse width control IC containing an oscillator is provided with external resistors and capacitors for setting the oscillation frequency of the oscillator contained in the pulse width control IC. However, commercially available resistors and capacitors generally have a margin of error of a few percent. The accuracy of the oscillation frequency thus set depends on the product of error margin of the external resistors and capacitors and the reference voltage set inside the pulse width control IC. Accordingly, there has been a limit to increasing the accuracy of the oscillation frequency.

SUMMARY OF THE INVENTION

It is an object of the present invention to provide a discharge lamp lighting apparatus which reduces the influence of a ripple current to improve the quality of light emitted from a discharge lamp and increase the lifetime of the discharge lamp.

It is another object of the present invention to provide a discharge lamp lighting apparatus which is effective in preventing an increase in size, cost, heat generation, and temperature.

It is still another object of the present invention to provide a discharge lamp lighting apparatus which is capable of stopping upon runaway of a microprocessor without having any external monitoring circuit and therefore effective in achieving miniaturization and cost reduction.

It is yet another object of the present invention to provide a discharge lamp lighting apparatus which is effective in increasing the accuracy of an oscillation frequency for controlling a pulse width.

To achieve at least one of the above-mentioned objects, the present invention provides a discharge lamp lighting apparatus comprising a DC/DC converter, a discharge lamp driver, a pulse width controller, and a microprocessor. The DC/DC converter is adapted to convert an input direct voltage to a direct voltage of a different voltage value than the input direct voltage by switching and then output the converted direct voltage. The discharge lamp driver is adapted to convert the output direct voltage, which is supplied from the DC/DC converter, to a voltage suitable for driving a discharge lamp.

The pulse width controller is adapted to generate a pulse width controlled switching control signal based on a reference pulse and then supply the switching control signal to the DC/DC converter. The microprocessor is adapted to supply to the pulse width controller a pulse width control signal for controlling the pulse width and the reference pulse in synchronism with the pulse width control signal.

The discharge lamp lighting apparatus according to the present invention is characterized by using a clock pulse of the microprocessor as the reference pulse for controlling the pulse width, instead of containing an oscillator for the reference pulse within the pulse width controller. With this configuration, the following effects can be obtained.

(1) Solving the Problems Related to Ripple Current

In discharge lamp lighting apparatuses of this type, the tube voltage of a discharge lamp, which normally falls within the range of 60V to 120V, increases with cumulative lighting time and sometimes reaches a hundred and several tens of voltage at the end of life. This is because the tube voltage depends on the interelectrode distance, which increases with cumulative lighting time because of the consumption of the electrodes.

On the other hand, the components for driving the discharge lamp, i.e., the DC/DC converter, discharge lamp driver, pulse width controller, microprocessor and so on operate to perform a constant power control where the product of a tube voltage and a tube current (output current) is kept constant by increasing the tube current with a decrease in the tube voltage while decreasing the tube current with an increase in the tube voltage.

In case of a step-down chopper which is widely used as the DC/DC converter, however, when the tube voltage is low, the voltage drop has to be large, increasing the loss and also the heat generation. When the tube voltage is high, on the other hand, the loss is small and therefore the heat generation is also small.

If it is tried to perform the constant power control for a discharge lamp of a low tube voltage, a large current corresponding to a large tube current has to be supplied to a DC/DC converter of a large loss (heat generation) for the constant power control, thereby further increasing the load on the DC/DC converter and also increasing the heat generation of the DC/DC converter.

In case of a discharge lamp of a high tube voltage, on the other hand, since the tube current is small, the DC/DC converter has a small loss (heat generation) from the first and is therefore allowed to generate heat to some degree, but its thermal margin cannot be exploited effectively.

In the present invention, a clock pulse of the microprocessor is used as the reference pulse for controlling the pulse width, instead of containing an oscillator for the reference pulse within the pulse width controller as in the conventional configuration. With this configuration, the above-described problems can be solved.

More specifically, since the microprocessor operates in accordance with a set program, the program may be set such that when the tube voltage is low and therefore the tube current has to be large, the frequency of the clock pulse or a pulse signal obtained therefrom is decreased to decrease the frequency of the switching control signal, which is to be supplied to the DC/DC converter, and the switching frequency of the DC/DC converter. This reduces the loss.

On the other hand, when the tube voltage is high, the tube current is small and the DC/DC converter has a small loss (heat generation) and is therefore allowed to generate heat to some degree. Thus, the program may be set such that the frequency of the clock pulse is increased to increase the frequency of the switching control signal, which is to be supplied to the DC/DC converter, and the switching frequency of the DC/DC converter. This reduces the ripple.

Since the switching operation of the DC/DC converter can be thus controlled with a program of the microprocessor, it is not necessary to increase the capacity of a capacitor or the inductance of an inductor in a smoothing circuit attached to the DC/DC converter. Accordingly, this will never lead to an increase in size and cost of the discharge lamp lighting apparatus. Moreover, since the frequency can be increased within a range considering the thermal margin of the DC/DC converter, it will never cause a problem.

(2) Solving the Problems Related to Microprocessor

If the microprocessor is influenced by some external factor to let the program run out of control in the discharge lamp lighting apparatus, the supply of the clock pulse from the microprocessor to the pulse width controller will be stopped, thereby stopping the operation of the pulse width controller and the discharge lamp lighting apparatus. Accordingly, it is not necessary to provide a monitoring circuit or the like for monitoring the runaway of the microprocessor, which results in achieving miniaturization and cost reduction of the discharge lamp lighting apparatus.

(3) Solving the Problems Related to Oscillation Frequency of Pulse Width Control IC Since the clock pulse of the microprocessor has a frequency accuracy of about a few percent, the accuracy of the oscillation frequency of the pulse width controller can be improved.

According to the present invention, as has been described above, there can be obtained at least one of the following effects.

(a) To provide a discharge lamp lighting apparatus which reduces the influence of a ripple current to improve the quality of light emitted from a discharge lamp and increase the lifetime of the discharge lamp.

(b) To provide a discharge lamp lighting apparatus which is effective in preventing an increase in size, cost, heat generation, and temperature.

(c) To provide a discharge lamp lighting apparatus which is capable of stopping upon runaway of a microprocessor without having any external monitoring circuit and therefore safe and effective in achieving miniaturization and cost reduction.

(d) To provide a discharge lamp lighting apparatus which is effective in increasing the accuracy of an oscillation frequency for controlling a pulse width.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
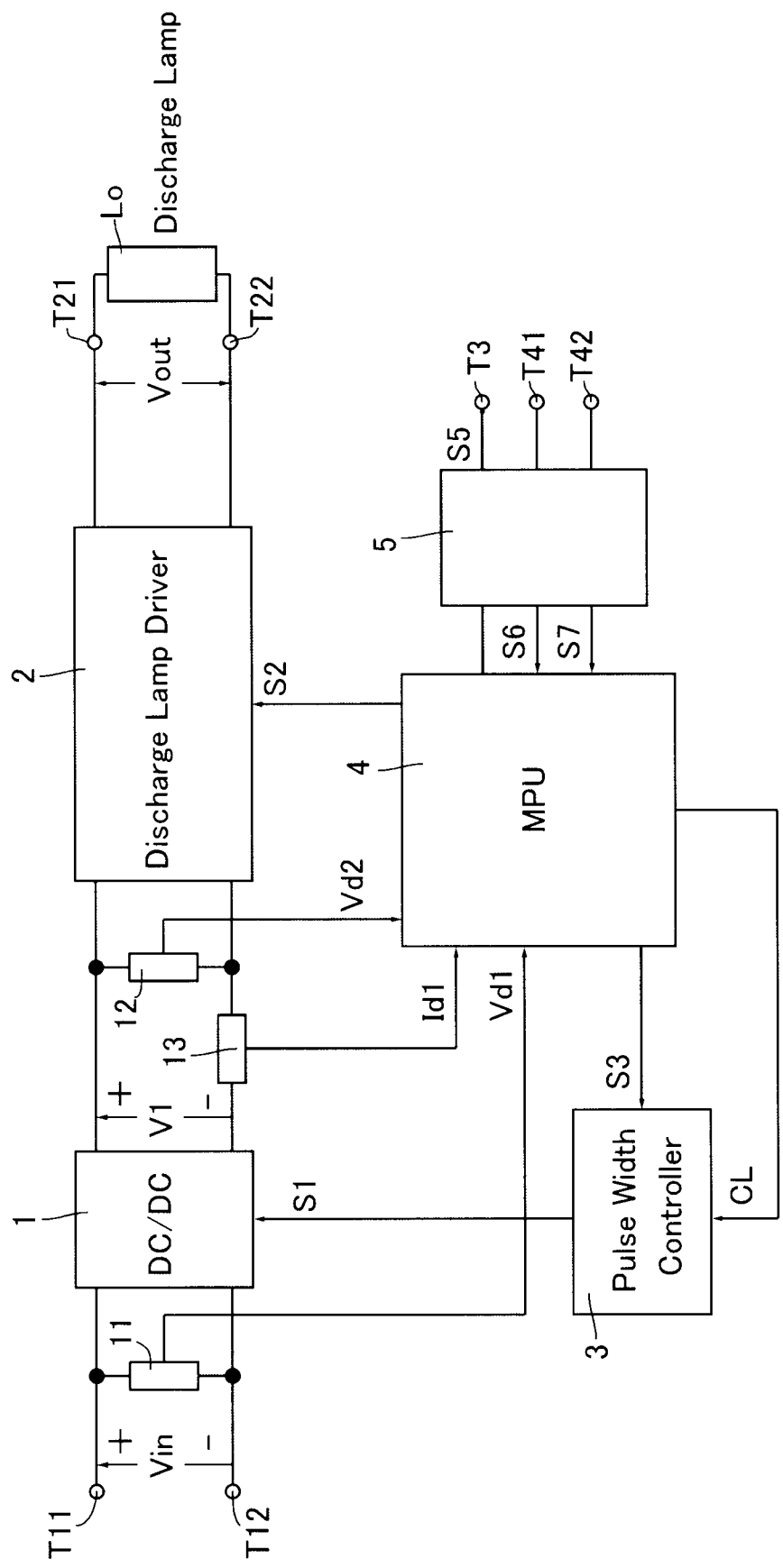
FIG. 1 is a block diagram showing a configuration of a discharge lamp lighting apparatus according to one embodiment of the present invention.

Referring to FIG. 1, the discharge lamp lighting apparatus includes a DC/DC converter 1, a discharge lamp driver 2, a pulse width controller 3, and a microprocessor 4.

The DC/DC converter 1 converts an input direct voltage Vin, which is supplied to input terminals T11, T12, to a direct voltage V1 of a different voltage value than the input direct voltage Vin by switching and then outputs the converted direct voltage V1. As the DC/DC converter 1, generally, there may be adopted a step-down chopper circuit with a smoothing circuit (not shown) provided at its output stage. The smoothing circuit may be of a capacitor input type including a capacitor and an inductor. Therefore, the direct voltage V1 output from the DC/DC converter 1 contains a ripple due to the switching frequency of the DC/DC converter 1. The input direct voltage Vin is obtained by rectifying and smoothing a commercial AC source or supplied from another DC source.

The discharge lamp driver 2 converts the direct voltage V1, which is supplied from the DC/DC converter 1, to a voltage Vout suitable for driving a discharge lamp L0. The discharge lamp driver 2 may adopt any one of the direct current starting method, the low frequency starting method, and the high frequency starting method.

The pulse width controller 3 generates a pulse width controlled switching control signal S1 based on a reference pulse CL and then supplies the switching control signal S1 to the DC/DC converter 1.

The microprocessor 4 controls the apparatus as a whole and supplies to the pulse width controller 3 a pulse width control signal S3 for controlling the pulse width and the reference pulse CL in synchronism with the pulse width control signal S3.

In the illustrated discharge lamp lighting apparatus, first of all, the input direct voltage Vin is switched by the DC/DC converter 1 and converted to the direct voltage V1 of a different voltage value than the input direct voltage Vin. The direct voltage V1 converted by the DC/DC converter 1 is supplied to the discharge lamp driver 2. The discharge lamp driver 2 converts the direct voltage V1, which is supplied from the DC/DC converter 1, to a voltage suitable for driving the discharge lamp L0. The discharge lamp L0 starts and then operates in a stationary manner with the voltage supplied from the discharge lamp driver 2.

To the DC/DC converter 1, the pulse width controlled switching control signal S1 is supplied from the pulse width controller 3, and the switching operation is performed by the DC/DC converter 1 in accordance with the pulse width controlled switching control signal S1.

The switching control signal S1 supplied from the pulse width controller 3 to the DC/DC converter 1 is generated from the pulse width control signal S3 and the reference pulse CL that are supplied from the microprocessor 4.

In the illustrated embodiment of the present invention, the discharge lamp lighting apparatus includes a voltage detection circuit 12 as in the prior art. The voltage detection circuit 12 detects the direct voltage V1, which is to be supplied to the discharge lamp driver 2, and supplies an obtained voltage detection signal Vd2 to the microprocessor 4. The microprocessor 4 changes frequency of the reference pulse CL, which is to be supplied to the pulse width controller 3, depending on a voltage value indicated by the voltage detection signal Vd2. The frequency control of the reference pulse CL is performed in accordance with a previously set program.

The illustrated discharge lamp lighting apparatus further includes a current detection circuit 13. The current detection circuit 13 detects a current to be supplied to the discharge lamp driver 2 and supplies an obtained current detection signal Id1 to the microprocessor 4. The microprocessor 4 controls the DC/DC converter 1 in such a manner as to stabilize power consumption of the discharge lamp L0 depending on the current detection signal Id1 and the voltage detection signal Vd2. This enables the constant power control. The constant power control is also performed in accordance with a previously set program of the microprocessor 4.

In FIG. 1, furthermore, there is provided an input voltage detection circuit 11 for monitoring the input direct voltage Vin and supplying an obtained voltage detection signal Vd1 to the microprocessor 4. In the case where the input direct voltage Vin is extremely decreased, for example, the microprocessor 4 supplies a protective operation signal such as a stop signal to the pulse width controller 3 depending on the voltage detection signal Vd1 supplied from the input voltage detection circuit 11.

FIG. 1 also shows a communication unit 5. The communication unit 5 has an insulating transmission circuit including, for example, a photocoupler and is connected to a communication port of the microprocessor 4. The communication unit 5 functions to send out a transmission signal S5, which includes control information of the microprocessor 4, from an output terminal T3 and also functions to supply to the microprocessor 4 a lighting instruction signal S6 and a received signal S7, which are supplied from the outside to an input terminal T41 and an input terminal T42, respectively.

In conventional discharge lamp lighting apparatuses, the reference pulse CL for generating the switching control signal S1 has been generated by an oscillator contained in a pulse width control IC of the pulse width controller 3. This has resulted in the creation of the problems described in detail hereinabove.

The discharge lamp lighting apparatus according to one embodiment of the present invention is characterized by using a clock pulse of the microprocessor 4 as the reference pulse CL for controlling the pulse width, instead of containing an oscillator for the reference pulse CL within the pulse width controller 3. With this configuration, the following effects can be obtained.

(1) Solving the Problems Related to Ripple Current

In discharge lamp lighting apparatuses of this type, the tube voltage of the discharge lamp L0, which normally falls within the range of 60V to 120V, increases with cumulative lighting time and sometimes reaches a hundred and several tens of voltage at the end of life. This is because the tube voltage depends on the interelectrode distance, which increases with cumulative lighting time because of the consumption of the electrodes.

On the other hand, the components for driving the discharge lamp L0, i.e., the DC/DC converter 1, discharge lamp driver 2, pulse width controller 3, microprocessor 4 and so on operate to perform a constant power control where the product of a tube voltage and a tube current (output current) is kept constant by increasing the tube current with a decrease in the tube voltage while decreasing the tube current with an increase in the tube voltage.

In case of a step-down chopper which is widely used as the DC/DC converter 1, however, when the tube voltage is low, the voltage drop has to be large, increasing the loss and also the heat generation. When the tube voltage is high, on the other hand, the loss is small and therefore the heat generation is also small.

If it is tried to perform the constant power control for the discharge lamp L0, a large tube current has to be supplied to the DC/DC converter 1 of a low tube voltage and a large loss (heat generation) for the constant power control, thereby further increasing the load on the DC/DC converter 1 and also increasing the heat generation.

In case of having a high tube voltage, on the other hand, since the tube current is small, the DC/DC converter 1 has a small loss (heat generation) from the first and is therefore allowed to generate heat to some degree, but its thermal margin cannot be exploited effectively.

In the present embodiment, a clock pulse of the microprocessor 4 is used as the reference pulse CL for controlling the pulse width, instead of containing an oscillator for the reference pulse CL within the pulse width controller 3 as in the conventional configuration, thereby solving the above-described problems.

More specifically, since the microprocessor 4 operates in accordance with a set program, the program may be set such that when the tube voltage is low and therefore the tube current has to be large, the frequency of the clock pulse or a pulse signal obtained therefrom is decreased to decrease the frequency of the switching control signal S1, which is to be supplied to the DC/DC converter 1, and the switching frequency of the DC/DC converter 1. This reduces the loss.

On the other hand, when the tube voltage is high, the tube current is small and the DC/DC converter 1 has a small loss (heat generation) and is therefore allowed to generate heat to some degree. Thus, the program may be set such that the frequency of the clock pulse is increased to increase the frequency of the switching control signal S1, which is to be supplied to the DC/DC converter 1, and the switching frequency of the DC/DC converter 1. This reduces the ripple.

Since the switching operation of the DC/DC converter 1 can be thus controlled with a program of the microprocessor 4, it is not necessary to increase the capacity of a capacitor or the inductance of an inductor in a smoothing circuit attached to the DC/DC converter 1. Accordingly, this will never lead to an increase in size and cost of the discharge lamp lighting apparatus. Moreover, since the frequency can be increased within a range considering the thermal margin of the DC/DC converter 1, it will never cause a problem.

(2) Solving the Problems Related to Microprocessor 4

If the microprocessor 4, which controls the discharge lamp lighting apparatus as a whole, is influenced by some external factor to let the program run out of control, the supply of the clock pulse (reference pulse) CL from the microprocessor 4 to the pulse width controller 3 will be stopped, thereby stopping the operation of the pulse width controller 3 and the discharge lamp lighting apparatus. Accordingly, it is not necessary to provide a monitoring circuit or the like for monitoring the runaway of the microprocessor 4, which results in achieving miniaturization and cost reduction of the discharge lamp lighting apparatus.

(3) Solving the Problems Related to Oscillation Frequency of Pulse Width Control IC Since the clock pulse (reference pulse) CL of the microprocessor 4 has a frequency accuracy of about a few percent, the accuracy of the oscillation frequency of the pulse width controller 3 can be improved.

Figure 2:
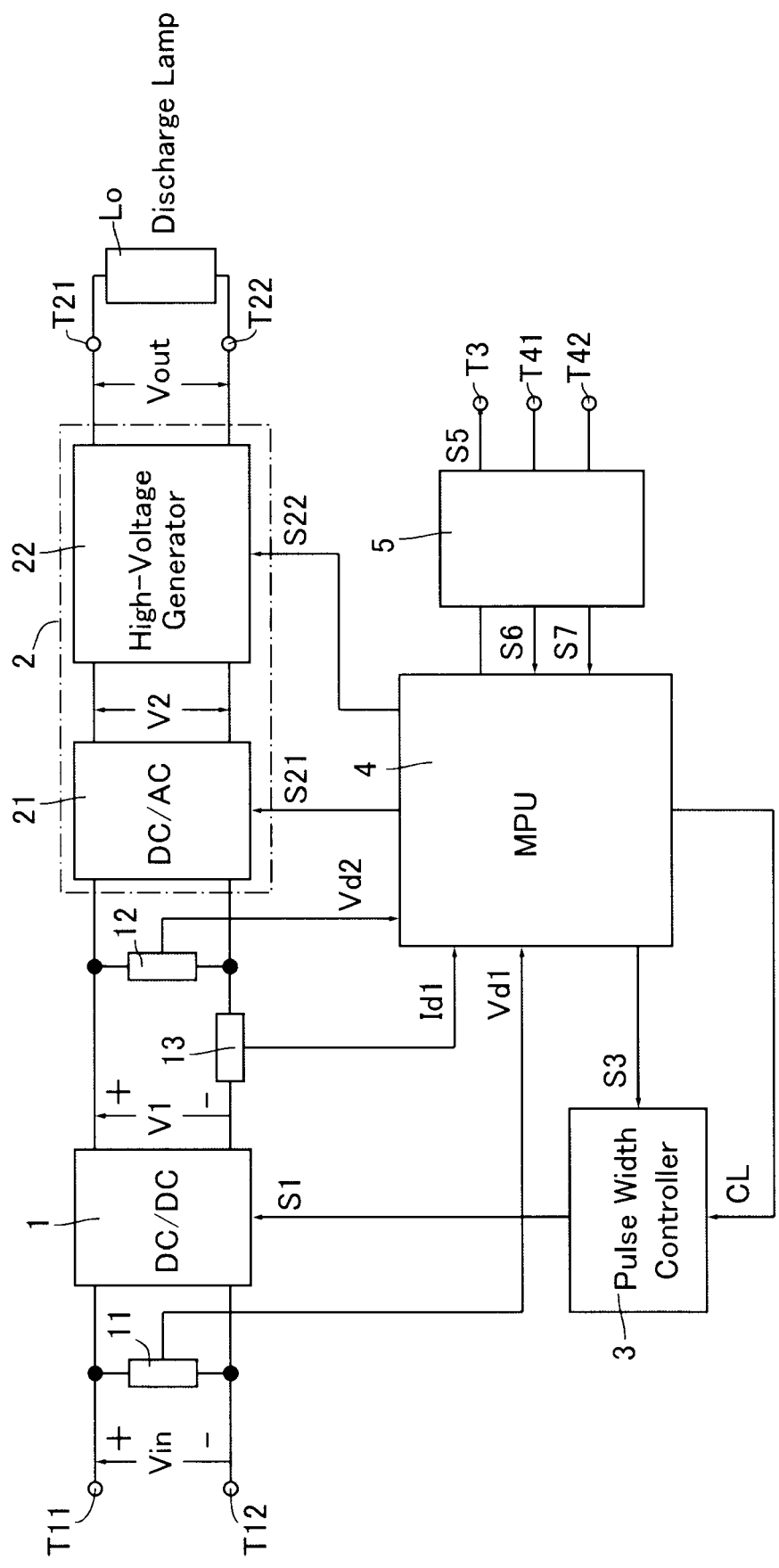
FIG. 2 is a block diagram showing a more detailed configuration of a discharge lamp lighting apparatus according to one embodiment of the present invention.

FIG. 2 is a block diagram showing a more detailed configuration of a discharge lamp lighting apparatus according to one embodiment of the present invention. In this figure, the components similar to those in FIG. 1 are designated by the same reference symbols and redundant description is omitted. In the illustrated discharge lamp lighting apparatus, the discharge lamp driver 2 includes a DC/AC inverter 21 and a high-voltage generator 22. The DC/AC inverter 21 converts the direct voltage V1 supplied from the DC/DC converter 1 to an alternating voltage V2 by switching at a lower frequency than the DC/DC converter 1. The operation of the DC/AC inverter 21 is controlled by a control signal S21 supplied from the microprocessor 4.

The high-voltage generator 22 generates the voltage Vout suitable for driving the discharge lamp L0 from the alternating voltage V2 supplied from the DC/AC inverter 21. As for the starting operation, the voltage Vout suitable for driving the discharge lamp L0 may be obtained by a conventional starting method such as a direct current starting method, a low frequency starting method, and a high frequency starting method. This is true for the stationary operation. This operation is controlled by a control signal S22 supplied from the microprocessor 4 to the high-voltage generator 22.

While the present invention has been particularly shown and described with reference to embodiments thereof, it will be understood by those skilled in the art that various changes in form and detail may be made therein without departing from the spirit, scope and teaching of the invention.

What is claimed is:

1. A discharge lamp lighting apparatus comprising:
   a DC/DC converter for converting an input direct voltage to a direct voltage of a different voltage value than the input direct voltage by switching and then outputting the converted direct voltage;
   a discharge lamp driver for converting the output direct voltage, which is supplied from said DC/DC converter, to a voltage suitable for driving a discharge lamp;
   a pulse width controller for generating a pulse width controlled switching control signal based on a reference pulse and then supplying the switching control signal to said DC/DC converter; and
   a microprocessor for controlling the apparatus as a whole and supplying to said pulse width controller a pulse width control signal and the reference pulse in synchronism with the pulse width control signal.

2. The discharge lamp lighting apparatus of claim 1, which further includes a voltage detection circuit, wherein
   said voltage detection circuit is adapted to detect the direct voltage, which is to be supplied to said discharge lamp driver, and then supply an obtained voltage detection signal to said microprocessor, and said microprocessor is adapted to change frequency of the reference pulse, which is to be supplied to said pulse width controller, depending on a voltage value indicated by the voltage detection signal.

3. The discharge lamp lighting apparatus of claim 2, which further includes a current detection circuit, wherein said current detection circuit is adapted to detect a current, which is to be supplied to said discharge lamp driver, and then supply an obtained current detection signal to said microprocessor, and said microprocessor is adapted to control said DC/DC converter in such a manner as to stabilize power consumption of the discharge lamp depending on the current detection signal and the voltage detection signal.

4. The discharge lamp lighting apparatus of claim 1, wherein said discharge lamp driver further includes a DC/AC inverter and a high-voltage generator, wherein said DC/AC inverter is adapted to convert the direct voltage supplied from said DC/DC converter to an alternating voltage by switching at a lower frequency than said DC/DC converter, and said high-voltage generator is adapted to generate a voltage suitable for driving the discharge lamp from the alternating voltage supplied from said DC/AC inverter.

5. The discharge lamp lighting apparatus of claim 2, wherein said discharge lamp driver further includes a DC/AC inverter and a high-voltage generator, wherein said DC/AC inverter is adapted to convert the direct voltage supplied from said DC/DC converter to an alternating voltage by switching at a lower frequency than said DC/DC converter, and said high-voltage generator is adapted to generate a voltage suitable for driving the discharge lamp from the alternating voltage supplied from said DC/AC inverter.

6. The discharge lamp lighting apparatus of claim 3, wherein said discharge lamp driver further includes a DC/AC inverter and a high-voltage generator, wherein said DC/AC inverter is adapted to convert the direct voltage supplied from said DC/DC converter to an alternating voltage by switching at a lower frequency than said DC/DC converter, and said high-voltage generator is adapted to generate a voltage suitable for driving the discharge lamp from the alternating voltage supplied from said DC/AC inverter.

* * * * *